United States Patent [19]

Maruoka

[11] Patent Number: 4,514,006
[45] Date of Patent: Apr. 30, 1985

[54] SYNTHETIC RESIN WINDSCREEN FOR MOTORCYCLES, MOTOR TRICYCLES, ETC.

[75] Inventor: Sigehiro Maruoka, Ohmiya, Japan

[73] Assignee: Honda Motor Co., Ltd., Tokyo, Japan

[21] Appl. No.: 442,099

[22] Filed: Nov. 16, 1982

[30] Foreign Application Priority Data

Nov. 17, 1981 [JP] Japan .................. 56-184287
Nov. 17, 1981 [JP] Japan .................. 56-184288

[51] Int. Cl.³ .............................................. B62J 17/02
[52] U.S. Cl. ..................................... 296/78.1; 428/157
[58] Field of Search ................... 296/78.1, 84 R, 91, 296/95 R, 97 A; 428/157, 156, 522; 264/167; 29/403, 526 R; 280/154.5 R

[56] References Cited

U.S. PATENT DOCUMENTS 4,027,914  6/1977  Yamamoto .................. 296/78.1
4,099,736  7/1978  Shiina ...................... 280/154.5 R Primary Examiner—Robert R. Song
Attorney, Agent, or Firm—Arthur L. Lessler

[57] ABSTRACT

A synthetic resin windscreen for motorcycles, motor tricycles, etc. comprises a fitting edge portion which is fixed to the body of a motorcycle or a motor tricycle, a screen surface main portion, and a screen surface peripheral edge portion, which are all integrally formed in one piece by means of injection molding, for instance. The above three portions have different thicknesses from each other, which are individually sufficient for ensuring respective required values of mechanical strength. At least part of the screen surface main portion is smaller in thickness than the fitting edge portion. Preferably, the screen surface main portion has its thickness gradually decreasing from a location adjacent the fitting edge portion to a location adjacent the screen surface peripheral edge portion.

4 Claims, 11 Drawing Figures

SYNTHETIC RESIN WINDSCREEN FOR MOTORCYCLES, MOTOR TRICYCLES, ETC.

BACKGROUND OF THE INVENTION

This invention relates to improvements in or to windscreens which are made of synthetic resin and adapted for use with automotive vehicles such as motorcycles and motor tricycles.

A motorcycle in general is provided with a windscreen which are made of synthetic resin and which are arranged at a front portion of the vehicle body in the vicinity of the steering handle, for protecting the rider from the rain, the wind or other disturbances.

Conventionally, windscreens of this kind are mostly manufactured by means of a vacuum molding method, which typically comprises heating a sheet or flat blank of a thermoplastic synthetic resin such as polyethylene which has been obtained by means of calendering or extrusion molding, clamping the resulting softened synthetic resin sheet in a mold having a mold surface corresponding in shape to a desired article or windscreen, then producing a vacuum in a gap between the mold and the sheet to cause the sheet to be struck to the mold surface, and then cooling the sheet to room temperature to cause it to cure.

However, according to such conventional vacuum molding method, it is impossible to shape a synthetic resin windscreen with desired different thicknesses over its whole surface. For this reason, a conventional synthetic resin windscreen manufactured by the vacuum molding method has a screen surface main portion with the same thickness as a fitting edge portion. That is, the thickness of the screen surface main portion is larger than an actually required thickness, resulting in a large total weight of the synthetic resin windscreen.

Further, the screen surface main portion of a conventional synthetic resin windscreen has almost a whole surface extending straight from a location adjacent the fitting edge location to a portion adjacent the screen surface peripheral edge portion to present straight and flat side surfaces. Therefore, a windscreen of this kind has its wind shielding effect determined only by the height or whole longitudinal size of the screen surface main portion. Therefore, to obtain a larger wind shielding effect, the height of the screen surface main portion has to be increased. However, the synthetic resin windscreen with an enlarged screen surface main portion has a generally increased whole surface area, so that it undergoes increased air resistance during running of a motorcycle or a motor tricycle on which it is installed, and also has large whole weight.

Moreover, the synthetic resin windscreen manufactured by the aforementioned conventional vacuum molding method requires not only trimming of its screen surface peripheral edge portion after discharge from the mold, but also drilling to form holes and notches in the fitting edge portion at predetermined locations for fitting the windscreen to a vehicle body, since simultaneous formation of such holes and notches are impossible during the molding step according to the vacuum molding method. This requires a large number of man-hours for the manufacture of a windscreen, and also leads to a poor yield, resulting in high manufacturing costs.

OBJECTS AND SUMMARY OF THE INVENTION

It is an object of the invention to provide a synthetic resin windscreen in which the fitting edge portion, the screen surface main portion and the screen surface peripheral edge portion are all integrally formed in one piece by means of injection molding, for instance, with their thicknesses different from each other but sufficient for ensuring respective required values of mechanical strength for exhibiting their respective functions, thus being light in weight and high in transparency.

It is a further object of the invention to provide a synthetic resin windscreen in which the screen surface main portion is generally curved in a manner warped forwardly of a vehicle body on which the windscreen is installed, and therefore can have an excellent wind shielding effect without increasing its overall size.

It is another object of the invention to provide a synthetic resin windscreen in which the fitting edge portion has increased rigidity and accordingly has enhanced stability in size and shape, thus facilitating the mounting of the windscreen onto a vehicle body.

According to the present invention, a synthetic resin windscreen has a fitting edge portion adapted to be fitted to windscreen mounting means provided on a front portion of the body of a motorcycle or a motor tricycle. A platelike screen surface main portion integrally extends from the fitting edge portion. A screen surface peripheral edge portion is formed along an outer periphery of the screen surface main portion in a manner forming the whole outer perimeter of the windscreen in cooperation with the fitting edge portion. The fitting edge portion, the screen surface main portion and the screen surface peripheral edge portion are integrally formed in one piece by means of injection molding, for instance. These three portions have different thicknesses from each other, but sufficient for ensuring respective required values of mechanical strength. At least part of the screen surface main portion has a thickness smaller than that of the fitting edge portion.

Preferably, the screen surface main location has its whole thickness gradually decreasing from a portion adjacent the fitting edge location to a portion adjacent the screen surface peripheral edge portion. Further, the screen surface main portion is generally curved forwardly of the vehicle body with its radius of curvature kept substantially constant or gradually decreasing from the location adjacent the fitting edge location to the portion adjacent the screen surface peripheral edge portion.

The screen surface peripheral edge portion preferably has a thickness larger than that of the screen surface main portion, and comprises a plurality of curved surface portions having different radii of curvature from each other.

The above and other objects, features and advantages of the invention will be more apparent from the ensuing detailed description taken in connection with the accompanying drawings.

DETAILED DESCRIPTION

The invention will now be described in detail with reference to the drawings.

Figure 1:
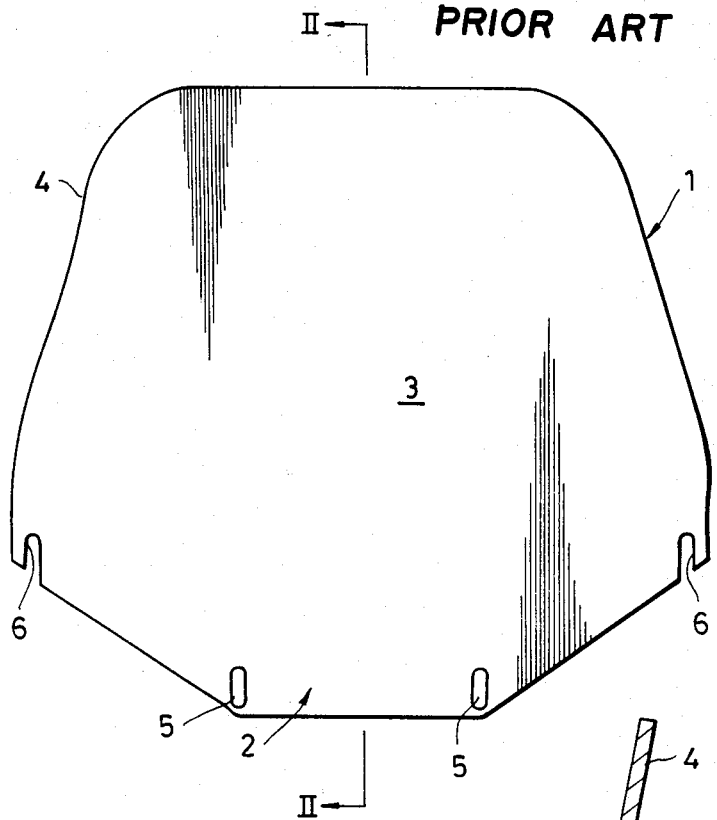
FIG. 1 is a schematic front view illustrating a conventional synthetic resin windscreen.
Figure 2:
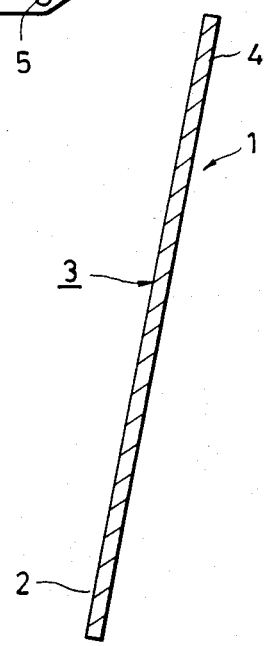
FIG. 2 is a schematic vertical sectional view taken along line II—II in FIG. 1.
Figure 3:
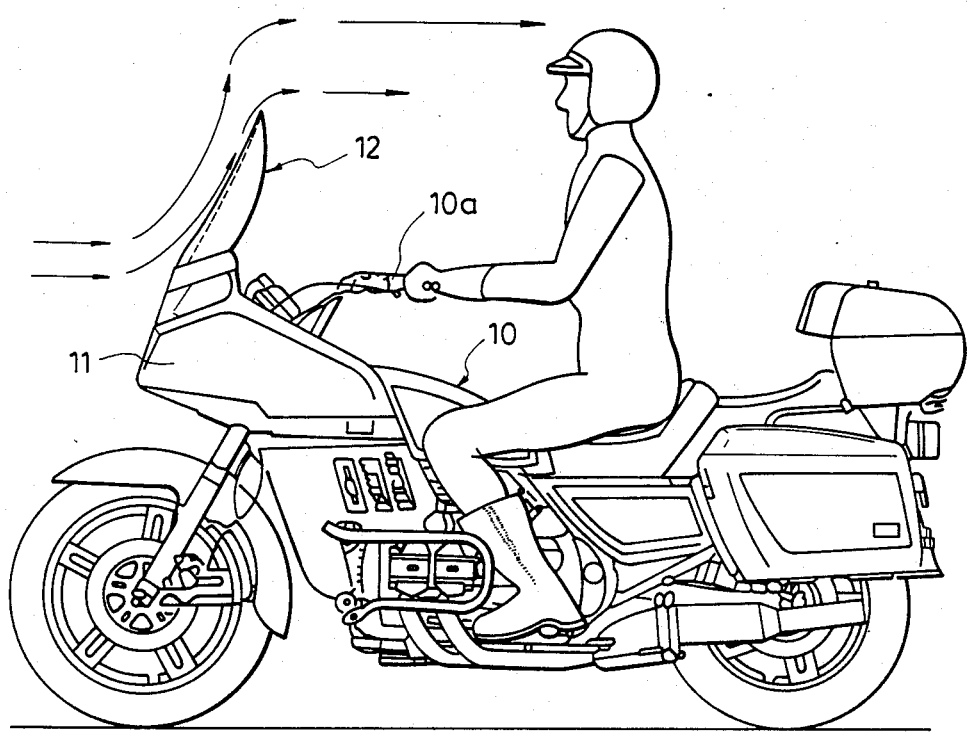
FIG. 3 is a schematic side view illustrating a motorcycle on which a synthetic resin windscreen according to an embodiment of the invention is installed.

Referring first to FIGS. 1 and 2, there is shown an example of a conventional synthetic resin windscreen which has been manufactured by a conventional vacuum molding method. The windscreen 1 comprises a fitting edge portion 2, a screen surface main portion 3 upwardly extending integrally from the fitting edge portion 2 and a screen surface peripheral edge portion 4 extending integrally along the outer periphery of the screen surface main portion 3. The peripheral edge portion 4 forms the outer perimeter of the windscreen 1 in cooperation with the fitting edge portion 2. As shown in FIG. 2, the screen surface main portion 3 extends straight from the fitting edge portion 2 to present straight and flat opposite side surfaces extending from the fitting edge portion 2 to the screen surface peripheral edge portion 4. The fitting edge portion 2, the screen surface main portion 3 and the screen surface peripheral edge portion 4 all have the same thickness which is set at such a value as can impart required mechanical strength to the fitting edge portion 2 which is acted upon by larger loads than the other two portions. Further, the fitting edge portion 2 is formed with elongate holes 5 and notches 6 for receiving fitting bolts or the like therethrough in mounting the windscreen onto windscreen mounting means, not shown, provided on a front portion of a body of a motorcycle or a motor tricycle, not shown. These holes and notches are formed by a separate step such as drilling, after rough formation of the windscreen 1 by means of a vacuum molding method. The conventional synthetic resin windscreen thus constructed and manufactured is heavy in weight and requires a large number of man-hours for the manufacture, resulting in high manufacturing costs. Further, the straight screen surface main portion requires a large surface area for achieving a required wind shielding effect.

The synthetic resin windscreen according to the present invention will now be described by referring to FIGS. 3 through 11.

Figure 4:
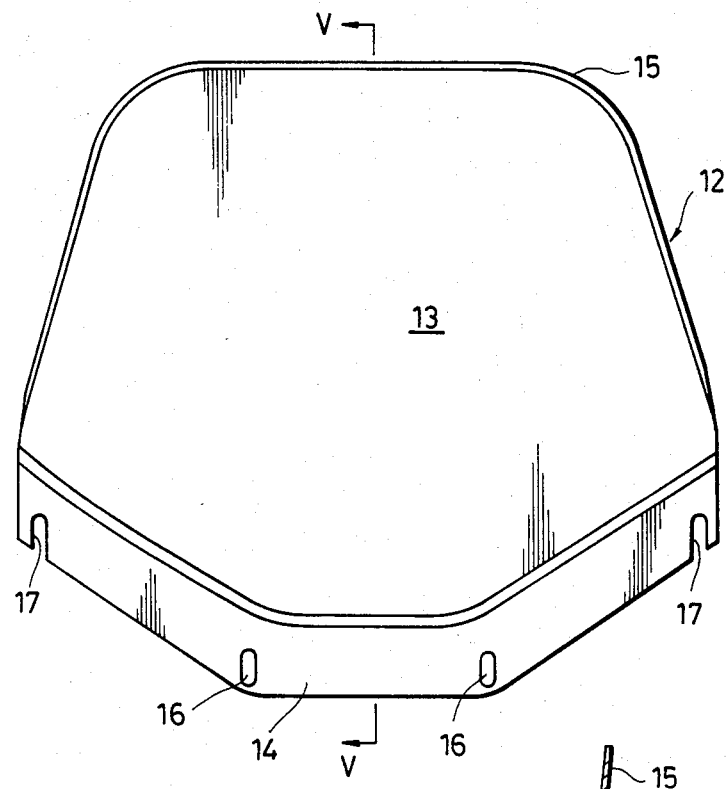
FIG. 4 is a schematic front view illustrating the synthetic resin windscreen in FIG. 3.
Figure 5:
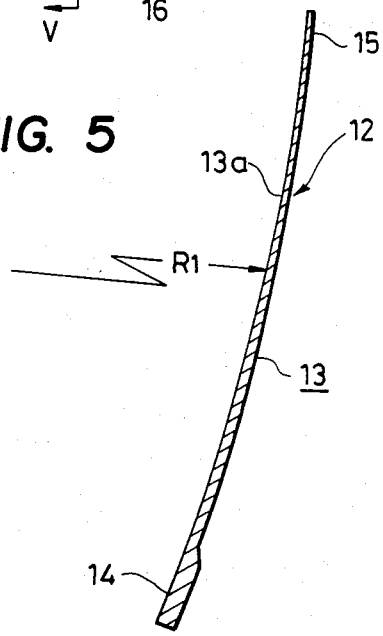
FIG. 5 is a schematic vertical sectional view taken along line V—V in FIG. 4.

A synthetic resin windscreen 12 according to the invention is mounted on a fairing body 11, by mounting means, hereinafter referred to, which body is provided at a front portion of a motorcycle 10 in the vicinity of a steering handle 10a. As shown in FIGS. 4 and 5, the synthetic resin windscreen 12 comprises a platelike screen surface main portion 13 having a predetermined size or surface area sufficient for obtaining a required wind shielding effect, a fitting edge portion 14 in the form of a band, formed adjacent a lower edge of the main portion 13 with a predetermined width, and a screen surface peripheral edge portion 15 extending along an outer periphery of the screen surface main portion 13 in a manner forming the whole outer perimeter of the windscreen 12 in cooperation with the fitting edge portion 14. These three portions 13, 14 and 15 are integrally formed in one piece by an injection molding method, for instance, as hereinafter described. The windscreen 12 has different thicknesses between the three portions 13, 14 and 15 in such a manner that the thickness becomes smaller in the order of the fitting edge portion 14, the screen surface peripheral edge portion 15 and the screen surface main portion 13, by the following reasons: The fitting edge portion 14, on which loads are most concentrated during running of a vehicle on which the windscreen is installed, should have a thickness sufficient to ensure required strength at the mounting portion of the windscreen on the vehicle body, for withstanding loads acting upon the fitting edge portion. On the other hand, the screen surface main portion 13, which has the largest area, should be as thin as possible so as to satisfy requirements of lightweight and high transparency. In the illustrated embodiment, the screen surface main portion 13 is tapered along its whole surface in such a manner that its thickness gradually decreases from a location immediately adjacent the fitting edge portion 14 toward a location immediately adjacent the screen surface peripheral edge portion 15. That is, the screen surface main portion 13 has different thicknesses at longitudinally different locations thereof so as to withstand different respective loads acting thereupon at the above locations during running of the vehicle. Further, in the illustrated embodiment, the screen surface main portion 13 is smoothly curved as a whole in a manner warped forwardly of the vehicle body 10 so that the front side surface 13a presents a concave surface, with its radius of curvature R1 substantially constant from a location immediately adjacent the fitting edge portion 14 to a location immediately adjacent the screen surface peripheral edge portion 15.

Figure 6:
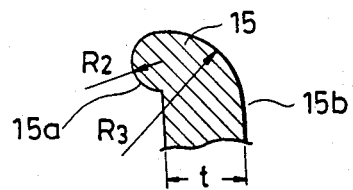
FIG. 6 is a fragmentary sectional view, on an enlarged scale, of the screen surface peripheral edge portion of the synthetic resin windscreen in FIG. 3.

On the other hand, the screen surface peripheral edge portion 15 extends along the outer periphery of the screen surface main portion 13 in the form of a peripheral fringe, and as shown in FIG. 6 comprises a front curved surface portion 15a having a radius of curvature R2, and a rear curved surface portion 15b having a radius of curvature R3 which is larger than the radius of curvature R2. The fringed or thickened edge portion 15 has improved flexural rigidity even if the thickness t of the adjacent portion of the screen surface main portion has a small value. The peripheral edge portion 15 thus serves to also impart increased flexural rigidity to the thin screen surface main portion 13 during running of the vehicle and enables to reduce the thickness of the main portion 13 for increased transparency.

Incidentally, in FIG. 4, reference numerals 16 and 16 designate elongate holes formed through the fitting edge portion 14 at an intermediate portion, and 17 and 17 notches formed in the same portion at opposite lateral sides. These holes and notches are adapted to receive therethrough bolts, not shown, for fixing the fitting edge portion 14 to the vehicle body, as hereinlater described.

Figure 7:
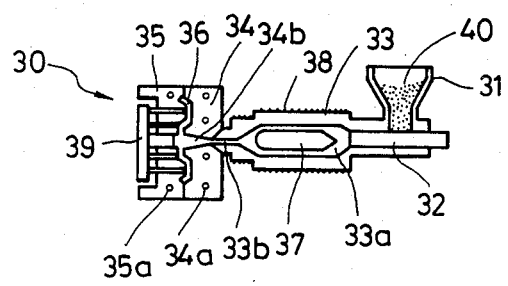
FIG. 7 is a schematic sectional view illustrating an injection molding device adapted for manufacturing a synthetic resin windscreen according to the present invention.

The synthetic resin windscreen according to the invention constructed above can be manufactured with ease by means of a conventional molding method such as injection molding. FIG. 7 illustrates an injection molding device for manufacturing the synthetic resin windscreen of the invention. The device 30 includes a hopper 31 in which is temporarily stored a thermoplastic synthetic resin raw material 40 such as polycarbonate. The raw material 40 is guided into the hollow interior 33a of a cylinder 33 by a reciprocating plunger 32 which is reciprocatingly driven by an oil hydraulic device, not shown. A torpedo 37 is arranged in the hollow interior 33a of the cylinder 33 and a resistor-type heating coil 38 is wound around the cylinder 33. The raw material 40 charged into the cylinder 33 is heated by the energized heating coil 37 to turn the material into a fluid state. The material 40 thus fluidized is forced through a nozzle 33b formed in the cylinder 33 and then through a sprue 34b of a first mold element 34 by the plunger 32 moving toward the first mold element 34 to be shot into a cavity 36 defined between the first mold element 34 and a second mold element 35. The second mold element 35 is urged against the first mold element 34 by means of another oil hydraulic device, not shown, drivingly connected thereto. The cavity 36 has a configuration corresponding to the shape of a synthetic resin windscreen 12 to be formed. The fluid material 40 shot into the cavity 36 is quenched to cure by cooling water circulating in cooling passages 34a and 35a formed in the first and second mold elements 34 and 35. The cured material 40 or the windscreen 12 is discharged from the mold after separating the mold elements 34 and 35 away from each other by pulling a pin 39 secured to the second mold element 35, as well as to the last-mentioned oil hydraulic device.

Figure 8:
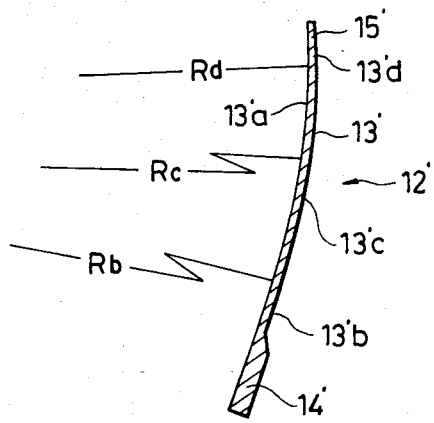
FIG. 8 is a schematic vertical sectional view showing a synthetic resin windscreen according to another embodiment of the present invention.

FIG. 8 illustrates another embodiment of the synthetic resin windscreen according to the invention. The windscreen 12' of FIG. 8 is distinguished from the above described embodiment in that the screen surface main portion 13' is generally curved in a manner warped forwardly of the vehicle body, not shown, with its radius of curvature gradually or steplike decreasing from a portion 13'b immediately adjacent the fitting edge 14' to at least an upper edge 13'd immediately adjacent the screen surface peripheral edge portion 15'. More specifically, as clearly shown in FIG. 8, the portion 13'b immediately adjacent the fitting edge portion 14' has a relatively large radius of curvature Rb, an intermediate portion 13'c a radius of curvature Rc smaller than the radius of curvature Rb, and the opposite upper edge portion 13'd immediately adjacent the screen surface peripheral edge portion 15' a radius of curvature Rd smaller than the radius of curvature Rc, respectively. By setting the radius of curvature in this manner, the screen surface main portion 13' has a further enhanced wind shielding effect as compared with the previous embodiment, specially at the upper edge portion 13'b adjacent the screen surface peripheral edge portion 15', which permits designing the screen surface main portion 13' and accordingly the windscreen 12' more compact in size.

Preferably, the screen surface main portion 13' is curved with its radius of curvature continuously gradually decreasing from the portion 13'b to the opposite portion 13'd.

Incidentally, one would hit upon an idea of locally curving only an upper edge portion of the screen surface main portion adjacent the screen surface peripheral edge portion in a forwardly warped manner. However, this would cause locally increased air resistance acting upon the above upper edge portion alone, which necessitates designing the windscreen to have larger structural strength enough to withstand the increased air resistance, and accordingly is disadvantageous.

Figure 9:
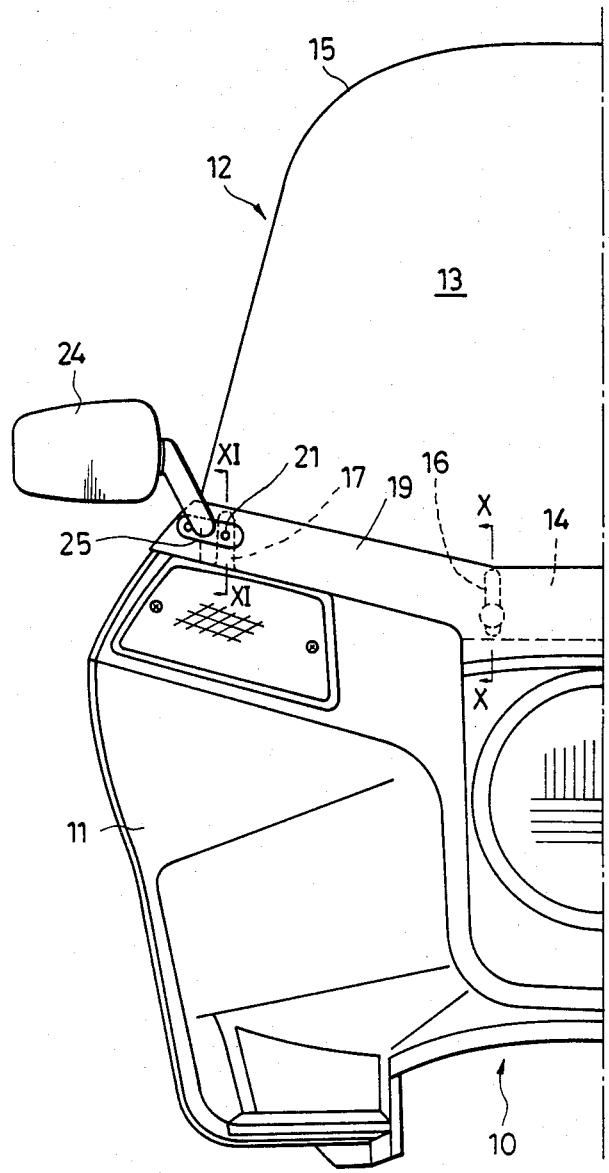
FIG. 9 is a fragmentary front view illustrating the synthetic resin windscreen in FIG. 3, showing in particular detail the fitting portions of the windscreen and the motorcycle body.
Figure 10:
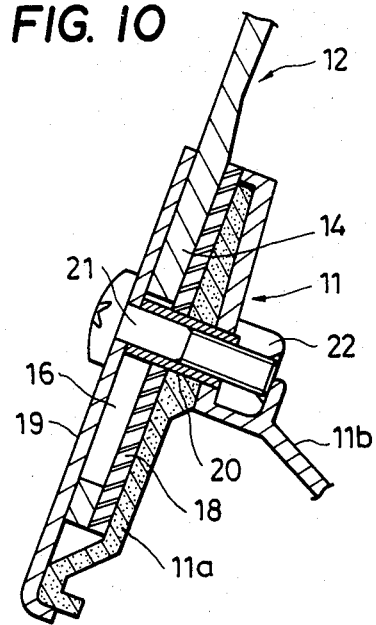
FIG. 10 is a fragmentary sectional view, on an enlarged scale, of the same portions of FIG. 9, taken along line X—X in FIG. 9.
Figure 11:
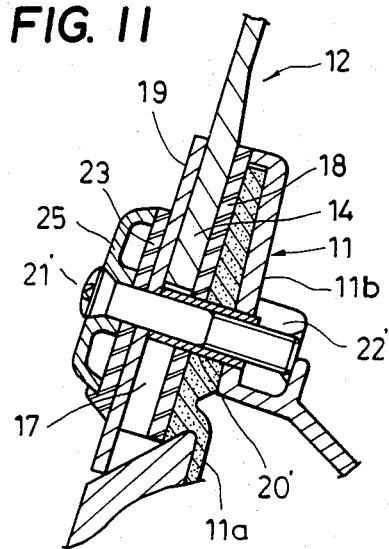
FIG. 11 is a fragmentary sectional view, on an enlarged scale, of the same portions of FIG. 9, taken along line XI—XI in FIG. 9.

The synthetic resin windscreen 12 or 12' (hereinafter referred to as 12 alone), which has been manufactured in the above described manner, is mounted in a manner illustrated in FIGS. 9 through 11. It is substantially vertically mounted on an outer member 11a of a fairing body 11 which is secured on a frame, not shown, forming part of the vehicle body 10, by means of a stay, not shown, at a front portion of the body 10. More specifically, as clearly shown in FIGS. 10 and 11, the fitting edge portion 14 of the synthetic resin windscreen 12 is interposed in a sandwiched manner between a cushion 18 and a garnish member 19. At the intermediate portion of the fitting edge portion 14 formed with the elongate holes 16 and 16, as shown in FIG. 10, two bolts 21 are each penetrated through the garnish member 19, and through a collar 20 which extends through an inner fairing member 11b disposed in contact with an inner side surface of the outer fairing member 11a and also through the fitting edge portion 14, followed by screwing a nut 22 onto each bolt 21 to fasten the above members together. On the other hand, at the opposite lateral side portions of the fitting edge portion 14 formed with the notches 17 and 17, as shown in FIG. 11, two bolts 21' are each fitted through a base plate 25 disposed on the garnish member 19, a sheet stay 23 interposed therebetween, and a collar 21' extending through the members 11b, 11a, 18 and 14, and a nut 22' is screwed onto the collar 21' to fasten the above members together. The distance by which the nut 22 or 22' can be moved along the bolt 21 or 21' for tightening is determined by the length of the collar 20 or 20'. The height of the synthetic resin windscreen 12 can be adjusted with respect to the vehicle body by adjusting the positions of bolts 21 and 21' with respect to the holes 16 and notches 17 which are both elongate longitudinally of the windscreen 12.

As set forth above, according to the invention, the fitting edge portion 14 on which loads are most concentrated has a largest thickness, and the screen surface main portion 13 has its thickness gradually decreasing away from the fitting edge portion 14. Therefore, the windscreen 12 of the invention is free of excessively thickened portions (which have excessive mechanical strength) and are therefore well balanced in strength throughout the whole windscreen. Thus, enhanced transparency and reduced weight are feasible without sacrificing the fitting or structural strength.

The smoothly curved configuration of the screen surface main portion 13 which is forwardly warped causes smooth fairing of air in a manner being upwardly blown to a high level from at least an upper edge of the screen surface main portion 13. This permits designing the screen surface main portion 13 compact in size with a smaller height or longitudinal size, as compared with the conventional straight extending screen surface main portion shown in FIG. 2.

The provision of the thickened or fringed screen surface peripheral edge portion 15 imparts enhanced flexural rigidity to the windscreen 12 during running of the vehicle, making it possible to reduce the thickness of the screen surface main portion without a loss in the fitting or structural strength.

The synthetic resin windscreen 12 of the invention which has the above-mentioned advantages can be easily manufactured in one body by means of a conventional molding method such as injection molding as previously described, which facilitates integral formation of fitting holes 16 and notches 17, etc. and requires lesser time for manufacturing a synthetic resin windscreen, leading to a good yield and accordingly a reduction in the manufacturing cost.

Further, the thickened fitting edge portion 14 has enhanced rigidity and accordingly high stability in size and shape, which also facilitates fitting the windscreen 12 onto a vehicle body.

Obviously many modifications and variations of the present invention are possible in the light of the above disclosure. It is therefore to be understood that within the scope of the appended claims the invention may be practiced otherwise than as specifically described.

What is claimed is:

1. A molded synthetic resin windscreen for use with a motor vehicle having a vehicle body and means for substantially vertically mounting the windscreen onto the vehicle body, comprising:

a fitting edge portion adapted to be fixed to said windscreen mounting means;

a screen surface main portion having a platelike configuration and extending upwardly from said fitting edge portion; and a screen surface peripheral edge portion extending along an outer periphery of said screen surface main portion, and forming a whole outer perimeter of said windscreen in cooperation with said fitting edge portion, said screen surface peripheral edge portion comprising a first curved portion facing forwardly of the vehicle body and having a predetermined radius of curvature, and a second curved surface portion facing rearwardly of the vehicle body and having a radius of curvature larger than said predetermined radius of curvature of said first curved portion;

said screen surface main portion being curved forwardly of the vehicle body with a radius of curvature thereof kept substantially constant from a portion thereof adjacent said fitting edge portion to a portion thereof adjacent said screen surface peripheral edge portion, said screen surface main portion having a thickness gradually and continuously decreasing from a portion thereof adjacent said fitting edge portion to a portion thereof adjacent said screen surface peripheral edge portion;

said fitting edge portion, said screen surface main portion and said screen surface peripheral edge portion being integrally formed in one piece and having thicknesses different from each other while being sufficient for ensuring respective required values of mechanical strength thereof;

the thickness of said windscreen becoming smaller in the order of said fitting edge portion, said screen surface peripheral edge portion, and said screen surface main portion.

2. The synthetic resin windscreen as claimed in claim 1, wherein said windscreen is injection molded.

3. A molded synthetic resin windscreen for use with a motor vehicle having a vehicle body and means for substantially vertically mounting the windscreen onto the vehicle body, comprising:

a fitting edge portion adapted to be fixed to said windscreen mounting means;

a screen surface main portion having a platelike configuration and extending upwardly from said fitting edge portion; and a screen surface peripheral edge portion extending along an outer periphery of said screen surface main portion, and forming a whole outer perimeter of said windscreen in cooperation with said fitting edge portion, said screen surface peripheral edge portion comprising a first curved portion facing forwardly of the vehicle body and having a predetermined radius of curvature, and a second curved surface portion facing rearwardly of the vehicle body and having a radius of curvature larger than said predetermined radius of curvature of said first curved portion;

said screen surface main portion being curved forwardly of the vehicle body with a radius of curvature thereof gradually decreasing from a portion thereof adjacent said fitting edge portion to a portion thereof adjacent said screen surface peripheral edge portion, said screen surface main portion having a thickness gradually and continuously decreasing from a portion thereof adjacent said fitting edge portion to a portion thereof adjacent said screen surface peripheral edge portion;

said fitting edge portion, said screen surface main portion and said screen surface peripheral edge portion being integrally formed in one piece and having thicknesses different from each other while being sufficient for ensuring respective required values of mechanical strength thereof, the thickness of said windscreen becoming smaller in the order of said fitting edge portion, said screen surface peripheral edge portion, and said screen surface main portion.

4. The synthetic resin windscreen as claimed in claim 3, wherein said windscreen is injection molded.

* * * * *